July 23, 1946.     C. R. SACCHINI     2,404,747
FLUID OPERATED MOTOR
Filed Jan. 10, 1944     2 Sheets-Sheet 1

INVENTOR
COLUMBUS R. SACCHINI
By George M. Soule
ATTORNEY

July 23, 1946.  C. R. SACCHINI  2,404,747
FLUID OPERATED MOTOR
Filed Jan. 10, 1944  2 Sheets-Sheet 2

INVENTOR
COLUMBUS R. SACCHINI
By Geo. M Soule
ATTORNEY

Patented July 23, 1946

2,404,747

UNITED STATES PATENT OFFICE 2,404,747

FLUID OPERATED MOTOR

Columbus R. Sacchini, Euclid, Ohio, assignor to The Marquette Metal Products Company, Cleveland, Ohio, a corporation of Ohio Application January 10, 1944, Serial No. 517,634

1 Claim. (Cl. 121—164)

This invention relates to fluid operated motors, and more particularly to a hydraulic motor designed primarily for use as a prime mover for window and windshield wiping mechanisms but also having many other applications requiring oscillating shafts.

Although the motor of the present invention is ideally adapted for driving windshield wipers on aircraft and meets the many exacting requirements of such installations, it is so simple in construction and comprises so few moving parts that it is also commercially feasible to use it for a similar purpose on all types of land vehicles. The motor develops a large torque in relation to its size and weight and therefore can be installed conveniently in crowded airplane cockpits. Sufficient power is available even in units of very small size to operate the wiper blade or blades in high slip stream and against ice accumulation. The efficiency of the motor is high, thereby keeping oil consumption at a minimum and the extremely rugged construction and few component parts insure long continued trouble-free operation and reduce maintenance costs. The motor can be economically manufactured due to the simple geometric configuration of most of the machined surfaces and, since sub-assemblies can be used, the final assembly is easily and speedily accomplished.

Provision is made in a novel manner for adjustment of the extent of wiper blade sweep both interiorly and exteriorly of the housing and for varying the angular travel of the wiper blade or blades on opposite sides of the center line of the unit by a simple, easily accessible adjustment interiorly of the housing. The motor also incorporates means for driving the power output shaft to a "parked" position of the wiper element or blade beyond the end of the normal stroke of such element or blade; and the construction enables either of two such parking positions to be used selectively whichever is more convenient or better suited to installation conditions. Also the wiper element or blade is forcibly but impositively held in the selected "parked" position against likelihood of disturbance by slip stream forces.

An object of this invention is to provide a fluid operated motor incorporating all of the foregoing features and which meets the various practical requirements of aircraft installations and others.

Another object is to provide an improved fluid operated motor.

A further object is to provide a fluid operated motor incorporating a cantilever spring as a snap-action driving means for a valve mechanism.

Still another object is to provide a fluid operated motor having a rotatable valve yieldably restrained in an operating position by a "ball and socket" detent mechanism.

Other objects and advantages will become apparent from the following description wherein reference is made to the drawings, in which Fig. 1 is an elevational view of the motor of this invention in combination with a windshield wiper mechanism associated with a typical airplane windshield section;

Fig. 2 is a sectional view taken along the line 2—2 of Fig. 1 and illustrating a preferred arrangement of the fluid supply conduits;

Figs. 3 and 4 are sectional views taken along the lines 3—3 and 4—4, respectively, of Fig. 2 in the direction of the arrows;

As will become apparent hereinafter, the motor operates properly in any turned position, hence terms such as front, rear, upward, and downward are not to be considered restrictive in any sense.

Figure 1:
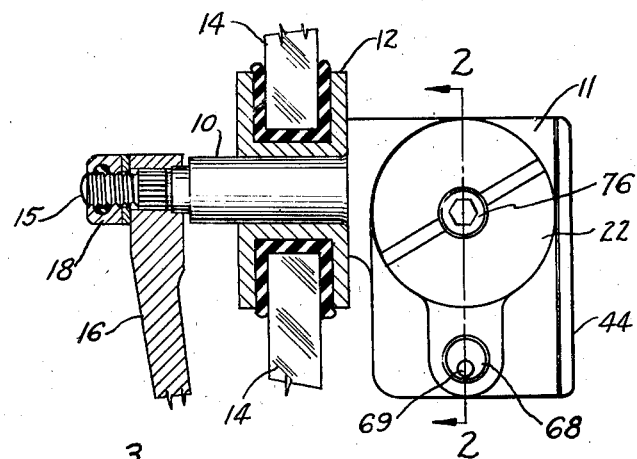

Referring to the drawings, an integral tubular projection or bushing 10 of a generally hollow body member 11 for the motor is shown in Fig. 1 as passing through an opening in a framework 12 of adjacent typical windshield panels 14. The bushing 10 is preferably cast extra long and then machined to the length required by the character of any particular installation. A power take-off shaft 15 rotatably supported by the bushing 10 may receive on a splined outer end portion a wiper blade drive arm 16 held in an adjusted turned position by cooperating splines and secured against outward axial movement by a nut 18 threaded on the end of the shaft 15. The motor is preferably held in mounted position by suitable studs or mounting bolts (not shown) passing into or through the framework 12 and screwed into the body 11, as on opposite sides of the bushing 10. Although a single drive arm 16 is shown in Fig. 1, it is obvious that suitable (e. g. flexible) shafting and cooperating means could be used to permit additional drive arms to be operated by the motor.

Figure 2:
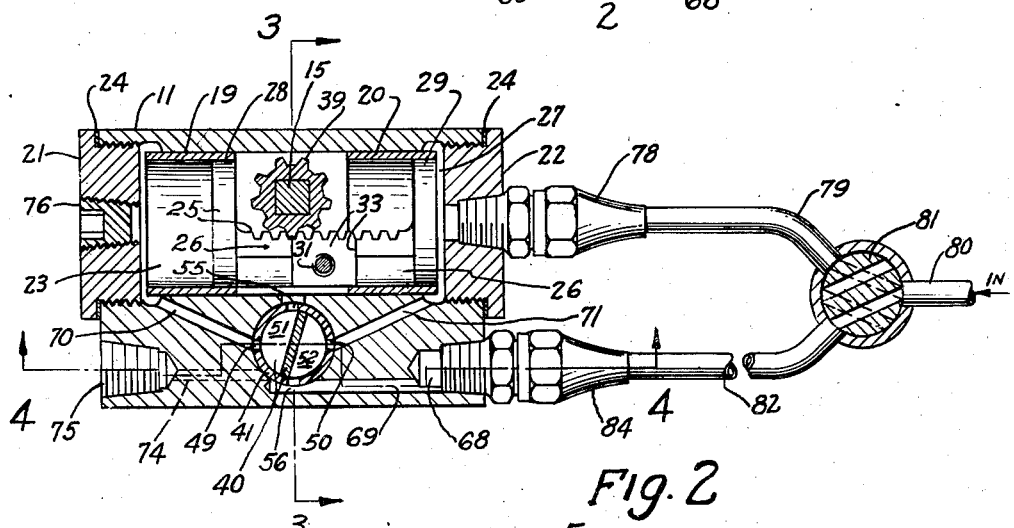

As shown most clearly in Fig. 2, piston sleeves 19 and 20 are pressed respectively into aligned openings in opposing side wall portions of the body 11, and have their outer ends extending a short distance into outer counterbored portions of the openings. The counterbored portions are threaded to receive flanged cylinder-head-constituting plugs 21 and 22, respectively, which, when screwed into sealed positions against suitable gaskets 24, have their inner ends spaced from the outer ends of the cylinder sleeves 19 and 20, respectively.

A central rack portion 26 of a piston 25 interconnects opposing piston head portions 28 and 29 which are slidably received within the sleeves 19 and 20, respectively. Piston chambers 23 and 27 are thus formed within the sleeves 19 and 20 between the outer faces of the head portions 28 and 29 and the plugs 21 and 22, respectively.

Figure 3:
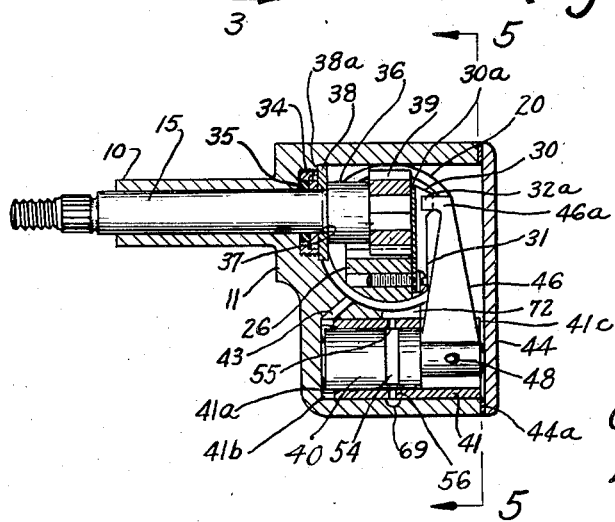
Figure 5:
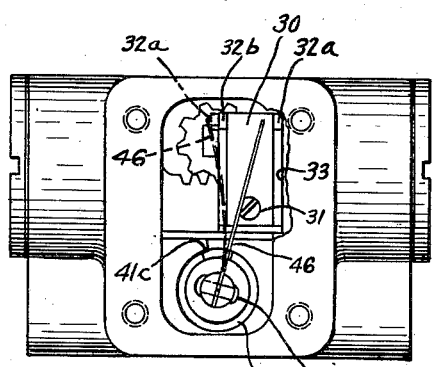
Fig. 5 is a fragmentary sectional view taken along the line 5—5 of Fig. 3 in the direction of the arrows.

The lower surface of the rack portion 26 is curved complementary to the inner surfaces of the sleeves 19 and 20 and said rack portion has a flattened rear surface provided with a transverse groove 33, extending vertically as shown in Fig. 2, in which groove a channel-shaped trip member or saddle 30 (Figs. 3 and 5) may be rigidly secured as by a single screw 31. The opposing legs of the saddle 30 fit snugly against the side walls of the groove 33, thereby to prevent turning of the saddle 30 with respect to the piston 25. Said legs at their upper ends have respective rearwardly extending projections or arms 32a and 32b.

A sealing nut 34 having a recess in which is received a suitable annular packing 35 surrounds the shaft 15 and is threaded into a counterbore at the inner end of the opening through the bushing 10. Axial movement of the shaft 15 rearwardly of the body 11 is prevented by interengagement of an annular shoulder 37, defined by an enlarged portion 36 of the shaft, and a washer 38 interposed between the nut 34 and the shoulder 37. Axial movement of the shaft 15 forwardly of the body 11 (to the left, Fig. 3) is prevented by a pinion 39 received on a reduced, non-circular (e. g. squared) inner end portion of the shaft 15 and bearing together with the end of the shaft 15 against the front surface of the bight portion 30a of the saddle 30. Rotation of the washer 38 may be prevented by forming the washer of a suitable bearing metal such as bronze so that a low-friction bearing surface with the shoulder 37 is provided, the shaft 15 being formed preferably of bronze or stainless steel, whereas the bearing surface, indicated at 38a, between the washer 38 and the body 11 has a much higher coefficient of friction particularly if the body 11 is of cast aluminum or aluminum alloy. The tendency of the washer 38 to turn may also be reduced, for example, by roughening the abutting surfaces at 38a. The pinion 39 is in constant mesh with the teeth of the rack 26 and is thus driven upon reciprocation of the piston 25 to effect oscillating motion of the shaft 15.

A valve assembly for the motor comprises a valve cylinder 40 rotatably received within a sleeve 41 pressed into a complementary socket or bore 41a intersecting the inner face of the front wall of the body 11. The front end portion of the sleeve 41 has an enlarged internal diameter as indicated at 41a to provide clearance for a tool used to grind accurately the inner surface of the sleeve 41 after the sleeve has been pressed into place, and is provided also at its front end with a longitudinal slot 41b to permit fluid trapped between the cylinder 40 and the front wall of the body 11 to escape into the interior of the body through a passage 43 communicating the forward end of the bore 41a with a low pressure space of the body 11.

Excessive axial movement of the valve cylinder 40 is prevented by abutment of the rear end face thereof against a cover plate 44 (see Figs. 3 and 4) secured to the body 11 at a suitable gasketed joint 44a as by screws 45.

In order to insure that the valve cylinder 40 will, at cessation of operation of the mechanism, always occupy one of two relatively reversed positions and not some position between those two, whereby upon resumption of supply of working pressure the motor will be certain to operate, a novel snap action drive mechanism is provided between the piston 25 and the valve cylinder. The driving connection between the piston 25 and the valve cylinder 40 comprises a flat cantilever spring 46 having its lowermost end secured within a diametrical slot in a reduced rear end portion of the cylinder 40, as by a rivet 48, and extending upwardly freely through an open longitudinal slot 41c (Fig. 5) in the sleeve 41. As will become apparent hereinafter, engagement of the spring 46 with the edges of the slot 41c prevents excessive rotary movement of the cylinder 40. The free portion of the spring 46 is preferably of uniform thickness but of gradually reduced width and terminates in a widened portion or lip 46a disposed between the arms 32a and 32b of the saddle 30.

The sleeve 41 has diametrically opposed ports 49 and 50 which, as shown for instance in Fig. 2, open respectively into chambers 51 and 52 defined by the inner wall surface of the sleeve 41 and opposed chordal slots 54 (Fig. 7) in the cylinder 40, and also has diametrically opposed ports 55 and 56 displaced ninety degrees from the ports 49 and 50 and which open alternately into the chambers 51 and 52 depending upon the turned position of the valve cylinder 40.

Figure 4:
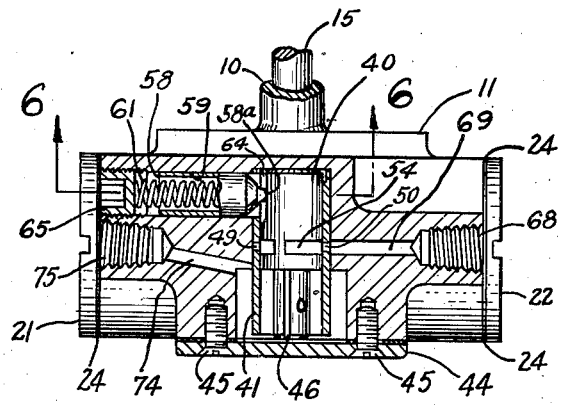
Figure 6:
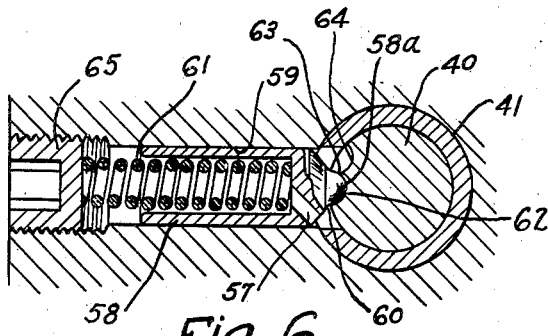
Fig. 6 is a relatively enlarged sectional view taken along the line 6—6 of Fig. 4 in the direction of the arrows.
Figure 7:
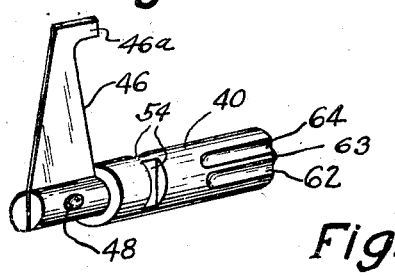
Fig. 7 is a perspective view of a part of the valve mechanism.

As shown in Figs. 4, 6 and 7, a tubular plunger 58 reciprocably received within a bore 59 in a side wall of the body 11 has a generally spherical projection or "ball" 58a formed integrally with and extending outwardly from the closed inner end of the plunger 58. As shown the inner ball supporting end of the plunger 58 is chamfered adjacent the ball formation and said end is received within a complementary opening 60 in the sleeve 41. A portion of the ball extends through the opening 60 and is normally biased by a coiled compression spring 61 alternately into spaced, semi-cylindrical, longitudinal grooves 62 and 64 formed in the surface of the front end portion of the cylinder 40 and defining therebetween an elongated rib or ridge 63 spaced from the sleeve 41. It should be noted that provision is made for slight axial movement of the cylinder 40 by forming the slots 54 slightly wider than the associated parts and by having the ball formation 58a cooperate with the elongated grooves 62 and 64 instead of spherical recesses. The spring 61 fits freely within the tubular plunger 58 and has its opposite ends bearing respectively against the inner end wall of the plunger 58 and the inner face of an adjusting screw 65 threaded into the outer end portion of the bore 59.

As will become apparent hereinafter, merely turning the screw 65 to vary the compression of the spring 61 adjusts the angular travel of the wiper blade drive arm 16. An opening 57 may be provided in the inner end wall of the plunger 58 to prevent entrapment of operating fluid or air within the bore 59. Trapped fluid which escapes through the port 57 enters an elongated groove 62 or 64 as the case may be and is discharged through the slot 41b, port 43 and into the housing chamber of the piston 25 between the ends of said piston.

An inlet port 68 for high pressure operating fluid communicates with the port 56 through a passage 69. Passages 70 and 71 extend from the ports 49 and 50, respectively, to the piston chambers 23 and 37, respectively. It should be noted that fluid may pass from the passages 70 and 71 between the plug 21 and the sleeve 19 and between the plug 22 and the sleeve 20, respectively, into the piston chambers, thus obviating the necessity for the forming of ports in the sleeves. A cut-away portion 72 of the front wall of the body 11 above the port 55 permits fluid to flow from the port 55 into the interior of the body 11 where it serves to lubricate the moving parts. An exhaust or discharge passage 74, Figs. 2 and 4, extends from the motor interior (at the region in which the sleeve 41 protrudes rearwardly from its guide bore) to an outlet port 75.

Each of the cylinder head plugs 21 and 22 is provided with a central, pipe-threaded opening and, as shown, a socket-headed plug 76 effectively seals the opening in the plug 21, whereas a tube coupling 78 screwed into the central opening in the plug 22 is connected to a fluid supply conduit 79 leading to a main supply conduit 80 through a suitable two-way valve 81. The other outlet port of the valve 81 is connected through a conduit 82 and a tube coupling 84 secured in the inlet port 68. When the valve 81 is in the position shown by solid lines in Fig. 2, fluid may flow from the conduit 80 through the valve 81 and the conduit 82 to the inlet port 68 for normal operation of the motor; and, when the valve is in the turned position indicated by the broken lines, fluid may flow from the conduit 80 through the valve 81 and conduit 79 directly to the piston chamber 27 for wiper blade "parking" as will be more fully described later.

Additional structural features of the motor and cooperative relation of the parts are explained in the following description of operation: With the piston 25 and valve cylinder 40 in the position shown in Fig. 2 and the two-way valve 81 in the solid line position, high pressure fluid in the main supply conduit 80 passes through the valve 81, the conduit 82, the coupling 84, the port 68, the passage 69, the port 56, the valve chamber 52, the port 50, and the passage 71 into the piston chamber 27. The pressure of the fluid in the chamber 27 on the face of the piston head 29, since flow of fluid from the chamber through conduit 79 is blocked by the valve 81, forces the piston 25 to the left (Fig. 2), and the teeth on the rack 26 consequently drive the shaft 15 clockwise. During movement of the piston 25 to the left, the arm 32a of the saddle 30 engages the lip 46a of the flat spring 46 and bends the spring, as suggested by broken lines in Fig. 5, causing a turning moment to be applied to the cylinder 40.

The turning moment increases uniformly with increased displacement of the piston 25 and is yieldably opposed and restrained by the ball 58a in the groove 62. When the moment exerted by the spring 46 increases to a predetermined value depending upon the adjusted position of the spring supporting screw 65, the plunger 58 moves outwardly against the bias of the spring 61 to enable the ball 58a to move out of the groove 62. The position of the spring 46 just prior to rotation of the valve cylinder 40 would ordinarily be approximately that indicated by the broken lines in Fig. 5. The restraining force of the ball 58a while in the groove 62 or groove 64 prevents any tendency for the valve cylinder 40 to rock while the spring 46 is being deflected preparatory to performing its snap action operation. At the instant of disengagement of the ball 58a and the groove 62, the valve cylinder 40 turns and is forced by the spring 61 into the groove 64 to hold the cylinder in its turned position with the ports 56 and 55 opening into the valve chambers 51 and 52, respectively.

Fluid now flows from the port 56 into the chamber 51 and therefrom through the port 49 and the passage 70 into the piston chamber 23. High pressure fluid in the chamber 23 forces the piston 25 to the right to effect counterclockwise (Fig. 2) rotation of the shaft 15 and gradual reverse bending of the spring 46 by engagement of the saddle arm 32b and the lip 46a of the spring 46. The spring 46 now exerts a gradually increasing turning moment on the cylinder 40, which, at a predetermined point in the travel of the piston 25, forces the cylinder 40 to return to its initial position with a snap action caused by the yieldable restraint of the ball 58a in the groove 64.

Movement of the piston 25 to the left forces fluid from the piston chamber 23 through the passage 70, the port 49, the valve chamber 51, and the port 55 into the interior of the body 11; and movement of the piston 25 to the right forces fluid from the piston chamber 27 through the passage 71, the port 50, the valve chamber 52 and the port 55 into the interior of the body 11. Excess fluid within the body 11 flows through the passage 74 to the discharge port 75.

From the foregoing description it will be clear that if the adjusting screw 65 is turned farther into the bore 59 to increase the compression of the spring 61, the ball 58a retards the turning movement of the cylinder 40 until the piston 25 has moved farther in either direction from a central position, whereas if the compression of the spring 61 is reduced, a shorter stroke of the piston 25 results. There is thus provided a simple means accessible from the outside of the body and providing for adjustment of the piston stroke and consequent movement of the wiper drive arm 16.

Normal operation of the motor is arrested by turning the valve 81 into the "parking" position indicated by the broken lines in Fig. 2. Fluid from the conduit 80 is now blocked from flowing into the conduit 82, but flows instead through the conduit 79 and the coupling 78 into the piston chamber 27 forcing the piston 25 to the left. When the piston 25 reaches the extreme left hand position, the wiper drive arm 16 is "parked" in a predetermined position pending return of the valve 81 to its initial position. Assuming, for example, that, at the time the valve 81 was turned to the broken line position, the valve cylinder 40 was in the position thereof illustrated, said valve cylinder will be rotated to its alternate position by the snap action mechanism hereof as the piston 25 is forced leftward, Fig. 2. Consequently, fluid introduced through the conduit 79 continues to be vented through passage 71, port 50, chamber 52 and port 55, finally through the discharge orifice 75 of the body 11. The venting of fluid from the piston chamber 27 is through a passageway which is restricted relative to the fluid introduction passage, so that kinetic force is maintained as "back pressure" against the piston head 29 so long as the valve 81 remains in the parking position.

It should be noted that, with the piston 25 in the parked position, the piston 25 has travelled beyond the length of its normal maximum stroke, the piston head 28 being in direct engagement with the inner face of the plug 21. Therefore, assuming the parking valve 81 is turned to parking position while the motor piston 25 is moving toward the left and only to the left as shown in Fig. 2, a wiper blade attached to the wiper drive arm 16 is "parked" slightly beyond the usual maximum area of clear vision. The kinetic force of the fluid against the piston 25 holds the wiper blade in its "parked" position with a force sufficient to resist the force of high slip stream. The coupling 78 and the plug 76 may be interchanged, as desired, so that the wiper drive arm 16 may be "parked" on either side of its normal working area, as desired.

Figure 8:
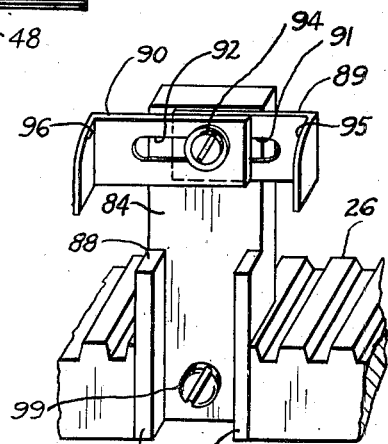
Fig. 8 is a detail view illustrating a modification of one feature of the invention.

Referring to Fig. 8, there is illustrated a modified saddle structure providing means for adjusting the extent of wiper blade travel in addition to that effected by change in the compression of the spring 61, and which also permits for adjustably causing the extent of wiper blade travel on opposite sides of the center line to be unequal in addition to the usual adjustment provided by the splined connection between the shaft 15 and the wiper drive arm 16. The saddle 30 of Figs. 2 to 7 may be replaced, preferably in motors of larger size, by a saddle 84 having side flanges 85 and 86 cut off at the top as at 88 to provide clearance for a pair of overlapping L-shaped trip members 89 and 90 having co-aligned slots 91 and 92, respectively.

The bight portion of the saddle 84 is preferably thick enough to receive in a threaded socket therein a screw 94 passing through the slots 91 and 92 to hold the trip members 89 and 90 in adjusted position.

The members 89 and 90 have rearwardly projecting arms 95 and 96, respectively, between which the lip 46a of the spring 46 may be disposed. The arms 95 and 96 thus function as the arms 32a and 32b of the saddle 30. By moving the members 89 and 90 inwardly toward the center of the saddle 84, the stroke of the piston 25 may be shortened, and, by moving the members 89 and 90 outwardly, the piston stroke may be lengthened. Furthermore, by causing the arms 95 and 96 to be at unequal distances from the center of the saddle 84 movement of the piston 25 and the wiper drive arm 16 may be caused to be unequal on opposite sides of the center line of the motor.

I claim:

In a hydraulic motor, a reciprocating piston, a reversible valve system operated through a snap action mechanism by the piston, a supply line for fluid, a valve arranged to divert the supplied fluid into one of two paths selectively, and conduit means constituting said paths and leading, respectively, from the valve to said valve system and directly to the piston working space, said valve system including means for exhausting fluid from the piston working space so long as fluid is supplied directly to said working space but through a relatively restricted passage, whereby the piston is kinetically held at one end of its stroke.

COLUMBUS R. SACCHINI.